United States Patent [19]
Vukovich et al.

[11] Patent Number: 5,119,697
[45] Date of Patent: Jun. 9, 1992

[54] CONTROL APPARATUS FOR REGULATING ENGAGEMENT OF A FLUID OPERATED TORQUE TRANSMITTING DEVICE

[75] Inventors: William J. Vukovich, Ypsilanti; Melissa M. Koenig, Ann Arbor; Donald F. Scherer, Redford, all of Mich.

[73] Assignee: General Motors Corporation, Detroit, Mich.

[21] Appl. No.: 692,416

[22] Filed: Apr. 29, 1991

[51] Int. Cl.⁵ .............................................. B60K 41/06
[52] U.S. Cl. .................................. 74/867; 192/109 F
[58] Field of Search ...................... 74/867; 192/109 F

[56] References Cited

U.S. PATENT DOCUMENTS

| | | | |
|---|---|---|---|
| 4,501,173 | 2/1985 | Honig | 74/867 X |
| 4,665,776 | 5/1987 | Sugano | 74/867 |
| 4,688,451 | 8/1987 | Sakai et al. | 74/867 |
| 4,722,251 | 2/1988 | Sumiya et al. | 74/867 X |
| 4,930,080 | 5/1990 | Suzuki | 192/109 F X |
| 5,035,312 | 7/1991 | Asayama et al. | 192/109 F X |

FOREIGN PATENT DOCUMENTS 59-151652  8/1984  Japan .

OTHER PUBLICATIONS

THM 700-R4 "Principles of Operation" (2nd. Ed.) by Hydra-Matic of GMC.
Isuzu Technician Guide, "Principles of Operation and Diagnosis", Automatic Transmission 4L30-E.

Primary Examiner—Leslie A. Braun
Assistant Examiner—Ryan W. Massey
Attorney, Agent, or Firm—Mark A. Navarre

[57] ABSTRACT

An electronically mechanized control method for regulating the engagement rate or stroke time of a fluid operated torque transmitting device, wherein the flow rate is controlled with a flow control device having a low flow state and a high flow state. The shift is initiated with the flow control device in the high flow state. After a variable delay time, the flow control valve is activated to the low flow state to complete the shift. The delay time is scheduled as an open-loop function of various system parameters to achieve the optimum amount of overlap between the on-coming and off-going torque transmitting devices. An adaptive learning control superimposed on the open-loop control trims the open-loop schedule to compensate for changes in system parameters or tolerance variations which affect the stroke time.

12 Claims, 6 Drawing Sheets

CONTROL APPARATUS FOR REGULATING ENGAGEMENT OF A FLUID OPERATED TORQUE TRANSMITTING DEVICE

This invention relates to an apparatus and control method for regulating the engagement of a fluid operated automotive torque transmitting device, and more particularly, to an electronic flow control of fluid supplied to the device.

BACKGROUND OF THE INVENTION

In motor vehicle multispeed ratio automatic transmissions, it is often desirable to shift from one speed ratio to another without the use of freewheeling or one-way devices. This requires a coordinated timing control of both off-going and on-coming fluid operated torque transmitting devices in order to achieve a desired amount of overlap as the transmitted torque is shifted from the off-going device to the on-coming device. Typically, the pressure supplied to the off-going device is progressively released through an orifice, while fluid pressure is supplied to the on-coming device through an accumulator or a servo in which an output element is displaced (stroked) by the supplied pressure.

Where a control of the on-coming device engagement time is desired, the fluid flow at the inlet or outlet of the accumulator or servo may be separately regulated. In one known system involving a servo actuated friction band device, for example, a speed-biased regulator valve is used to vary a restriction for fluid being displaced by the servo piston. In another similar system, an electrohydraulic valve is pulse-width-modulated at a variable duty cycle to vary a restriction at the fluid inlet of the servo. Unfortunately, these systems are relatively expensive to implement and often exhibit some level of supply pressure sensitivity, degrading the ability of the control to achieve the desired on-coming engagement time.

SUMMARY OF THE PRESENT INVENTION

The present invention is directed to an improved electronic control apparatus and method for regulating the engagement or stroke time of a fluid operated torque transmitting device, wherein the flow of fluid to the device is regulated with a flow control valve having a low flow state and a high flow state. The shift is initiated with the flow control valve in the high flow state. After a variable delay time, the flow control valve is activated to the low flow state to complete the shift. A relatively short delay time will decrease the average flow rate during the shift to increase the stroke time, while a relatively long delay time will increase the average flow rate during the shift to decrease the stroke time.

The delay time is scheduled as an open-loop function of various system parameters to achieve the optimum amount of overlap between the on-coming and off-going torque transmitting devices. An adaptive learning control superimposed on the open-loop control trims the open-loop schedule to compensate for changes in system parameters or part-to-part tolerance variations which affect the stroke time.

The digital or on-off nature of the flow control device avoids the expense of precision regulator or PWM valves The supply or line pressure sensitivity is drastically reduced because of the adaptive learning control, and because the delay time can be scheduled as a function of the same variables which determine line pressure.

In the illustrated embodiment, the apparatus of this invention is mechanized in connection with a wash-out type shift control arrangement substantially as set forth in U.S. Pat. No. 2,865,227 to Kelley et al., issued Dec. 23, 1958, and assigned to the assignee of the present invention. In that arrangement, the servo for an off-going band brake operates as an The flow control device of this invention operates when a subsequent clutch-to-band downshift is required by controlling the stroke time of the servo for engaging the on-coming band brake.

DETAILED DESCRIPTION OF THE INVENTION

Figure 1:
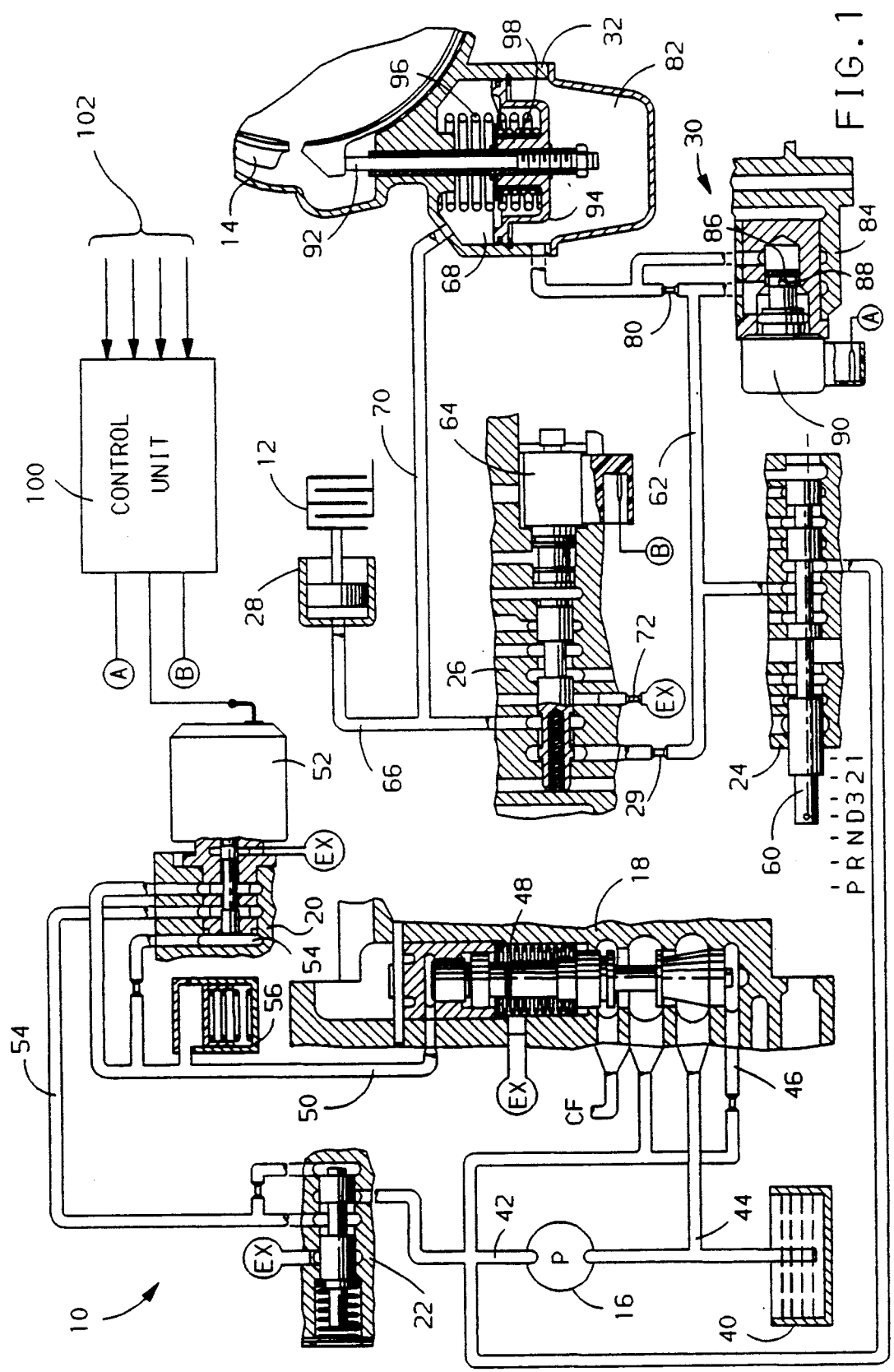
FIG. 1 depicts a control apparatus according to this invention, sectional views of various hydraulic transmission control elements, including the flow control valve, and a computer-based control unit for carrying out line pressure and shift controls.

Referring particularly to FIG. 1, the reference numeral 10 generally designates an array of hydraulic transmission control elements for regulating the engagement and disengagement of friction clutch 12 and band brake 14 to effect shifting between a pair of forward transmission speed ratios. In a typical application, a 1:1 or direct ratio (3rd) is provided with engagement of the clutch 12, and an underdrive ratio (2nd) is provided with engagement of the band brake 14. Thus, a 2-3 upshift is achieved through concurrent disengagement of band brake 14 and engagement clutch 12, while a 3-2 downshift is achieved through concurrent disengagement of clutch 12 and engagement band brake 14. As explained below, this invention concerns the engagement of band brake 14 to effect a 3-2 downshift.

The illustrated hydraulic elements include a positive displacement mechanically driven hydraulic pump 16, a pressure regulator valve 18, a force motor controlled line pressure bias valve 20 and limit valve 22, an operator manipulated manual valve 24, a solenoid controlled 2-3 shift valve 26, a clutch apply servo 28, a fluid restriction circuit 30, and a band apply servo 32. The pump 16 receives hydraulic fluid at low pressure from the fluid reservoir 40, and supplies line pressure fluid to the transmission control elements via output line 42. Pressure regulator valve 18 is connected to the pump output line 42 and serves to regulate the line pressure and torque converter feed pressure (CF) by returning a controlled portion of the line pressure to reservoir 40 via the line 44.

The pressure regulator valve 18 is biased at one end by orificed line pressure in line 46 and at the other end by the combination of a spring 48 and a controlled bias pressure in line 50. The controlled bias pressure is supplied by the line pressure bias valve 20 which develops pressure in relation to the current supplied to electric force motor 52, the force motor 52 being hydraulically balanced by the pressure in bias chamber 54. Line pressure is supplied as an input to bias valve 20 via line 54 and the limit valve 22. An accumulator 56 connected to the bias pressure line 50 serves to stabilize the bias pressure.

With the above-described valving arrangement, it will be seen that the line pressure of the transmission is electrically regulated by force motor 52. In the event of an interruption of electrical power to the force motor 52, the bias pressure in line 50 assumes a maximum value, thereby forcing maximum line pressure.

The friction clutch 12 and band brake 14 are activated by conventional fluid servos 28 and 32, respectively. The servos 28 and 32, in turn, are connected to a fluid supply system comprising the manual valve 24, the 2-3 shift valve 26, and the fluid restriction circuit 30. The manual valve 24 develops a supply pressure D32 for the 2nd and 3rd forward speed ranges of the transmission in response to driver positioning of the transmission range selector lever 60. The D32 pressure, in turn, is supplied via line 62 to the shift valve 26 and fluid restriction circuit 30 for application to the servos 28 and 32.

The shift valve 26 is spring-biased against a controlled bias pressure developed by the solenoid 64, the valve 26 being illustrated in its activated state. In the illustrated state, the shift valve 26 supplies D32 supply pressure to the clutch servo 28 via line 66 and to a release chamber 68 of band brake servo 32 via line 70. In the deactivated state, the lines 66 and 70 are exhausted via exhaust port 72.

The fluid restriction circuit 30 comprises a first orifice 80 connecting the D32 supply pressure line 62 to an apply chamber 82 of band brake servo 32, and a solenoid operated flow control valve 84. The flow control valve 84 is selectively controlled to connect a second orifice in parallel with the first orifice 80, the second orifice being defined by the valve seat 86. The flow control valve 84 includes a pintle armature 88 which is normally retracted from the seat/orifice 86 by a return spring (not shown) to connect the second orifice in parallel with the first orifice 80, and a solenoid 90 which when electrically activated (energized) extends the pintle armature 88 into engagement with the seat/orifice 86.

Thus, fluid pressure is supplied to the servo inlet chamber 82 via the parallel combination of orifices 80 and 86 when solenoid 90 is deactivated, and via the orifice 80 alone when solenoid 90 is activated. The deactivated condition thereby defines a high flow state, while the activated condition defines a low flow state. As described below, the valve 84 is controlled to its high flow state at the initiation of a 3-2 downshift, and is controlled to its low flow state after a determined delay time Td.

The servo 32 includes a post 92 fastened to a diaphragm 94 which is axially displaceable within the servo housing. A pair of springs 96 and 98 reacting against the housing of servo 32 urge the diaphragm 94 and hence the post 92 downward, as viewed in FIG. 1, to release the band brake 14. The spring forces may be aided by fluid pressure in release chamber 68 or opposed by fluid pressure in apply chamber 82.

Reference numeral 100 designates a computer-based control unit which develops suitable electrical control signals for the force motor 52 and the solenoids 64 and 90 in response to a variety of vehicle and powertrain parameters, represented by the input lines 102. The line pressure control of force motor 52 is essentially continuous during operation of the transmission, ensuring that the developed pressure is sufficient to prevent clutch slippage during steady state operation, and providing shift quality control during shifting. The control of solenoids 64 and 90, on the other hand, pertain strictly to shifting and are discrete or on-off in nature.

In 2nd ratio operation, the shift valve solenoid 64 is deactivated so that the clutch servo 28 and the band brake servo release chamber 68 are vented through shift valve exhaust port 72. The servo apply chamber 82 is maintained at D32 supply pressure via fluid restriction circuit 30, overcoming the spring bias to extend the servo post 92 and engage the band brake 14.

When a 2-3 upshift is required, the control unit 100 activates the shift valve solenoid 64 to connect the D32 supply pressure to clutch servo 28 and the release chamber 68 of band brake servo 32 via orifice 29. This pressure balances the apply chamber pressure, allowing the springs 96 and 98 to stroke the diaphragm 94, retracting the post 92 as the apply chamber fluid is displaced through the fluid restriction circuit 30 and into the pressure control line 62. During this operation, the solenoid 90 is deactivated, and the flow control valve 84 is in its high flow state. The pressure in the clutch servo 28 builds as a function of the spring rates and orifices, engaging the clutch 12 as the band brake is released. This is a conventional band-to-clutch wash-out upshift.

When a 3-2 downshift is required, the control unit 100 determines a delay time Td for the flow control valve 84, and deactivates the shift valve solenoid 64 to vent the fluid in clutch servo 28 and band brake servo release chamber 68. The determination of delay time Td is described below in reference to FIG. 3. The combination of the line pressure (D32) and the effective orifice size of fluid restriction circuit 30 determines the fluid flow rate into servo apply chamber 82, which in turn, determines the stroke time of the servo post 92. Once the shift is complete, there is no flow through the fluid restriction circuit 30, and the solenoid 90 is deactivated.

Figure 2:
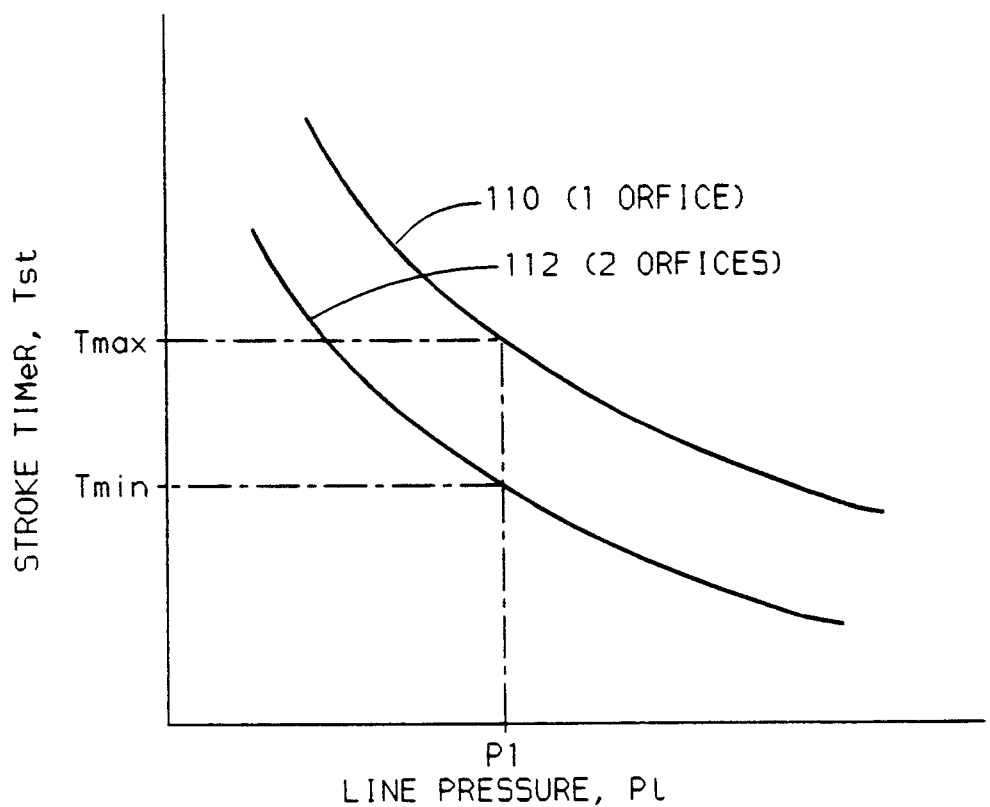
FIG. 2 graphically depicts the ranges of servo stroke time which can be achieved by each state of the flow control valve of FIG. 1.

The graph of FIG. 2 illustrates the relationship between the stroke time of band brake servo 32 and the transmission line pressure, with and without activation of the flow control valve solenoid 90. When the solenoid 90 is activated and the supply pressure can only pass through orifice 80, the relationship is given by the "1 ORIFICE" trace 110. As one would expect, increasing line pressure increases the fluid flow, thereby decreasing the stroke time; similarly, decreasing line pressure decreases the fluid flow, thereby increasing the stroke time. When the shuttle valve solenoid 90 is deactivated and the supply pressure can pass through the valve seat orifice 86 as well as the orifice 80, the relationship is given by the "2 ORIFICE" trace 112. The parallel combination of orifices 86 and 80 permits increased flow, resulting in reduced stroke time for a given line pressure.

The graph of FIG. 2 also shows that the range of available stroke times depends on the transmission line pressure. At pressure Pl, for example, the shortest stroke time Tmin is achieved by maintaining the high flow (two orifice) state throughout the shift, while the longest stroke time Tmax is achieved by maintaining the low flow (one orifice) state throughout the shift. Stroke times between Tmin and Tmax are obtained, according to this invention, by initiating the shift in the high flow state and switching to the low flow state after a determined delay time Td. Of course, a zero delay time would result in a stroke time of Tmin, and a long delay time would result in a stroke time of Tmax. As the line pressure increases above Pl, both Tmin and Tmax decrease; as the line pressure decreases below Pl, both Tmin and Tmax increase Since the same considerations which generally dictate an increase in stroke time dictate a decrease in line pressure, and vice versa, the range of available stroke times (Tmax−Tmin) is generally adequate to achieve optimum shift timing control. The primary control parameters for both line pressure and stroke time are vehicle speed and transmission input torque, as typically represented by engine throttle position. As the vehicle speed increases, it is generally advantageous to decrease line pressure to reduce spin losses, and to increase the downshift stroke time so that the input speed can substantially reach the 2nd ratio speed by the time the band brake 14 engages. As the input torque increases, it is generally advantageous to increase the line pressure to prevent steady state clutch slippage, and to decrease the downshift stroke time to limit the energy absorbed by the on-coming band brake.

Figure 3:
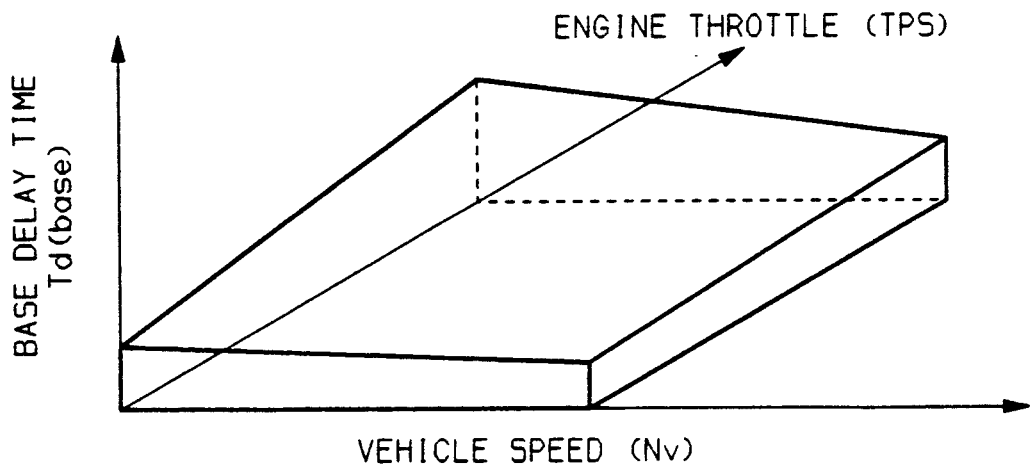
FIG. 3 depicts a representative 3-D look-up table for scheduling the flow control valve delay tim as a function of vehicle speed and engine throttle position.

The above considerations, at least with respect to stroke time, are reflected in the 3-D look-up table representation of FIG. 3. Thus, for a given engine throttle position, the desired delay time Td decreases with increasing vehicle speed to provide increasing servo stroke time. For a given vehicle speed, the desired delay time Td increases with increasing engine throttle position to provide decreasing servo stroke time.

In the above described mechanization, it is most convenient to address the effects of line pressure variations by empirically determining and storing delay time values into the look-up table of FIG. 3. That is, the delay time values which are empirically found to achieve the desired stroke times in various operating conditions of the powertrain are stored in a look-up table or data array as a function of the corresponding engine throttle position vs. vehicle speed test points. Delay times for engine throttle position vs. vehicle speed operating points between empirically determined values are determined by interpolation. Factors compensating for the effects of temperature and altitude variations may also be taken into account.

In the preferred embodiment of this invention, a second look-up table or data array is provided for the storage of adaptive corrections to the table depicted in FIG. 3. As explained below in connection with FIGS. 4 and 6b, the performance of the transmission control in the course of normal 3-2 downshifts is measured and compared to a reference indicative of high quality shifting. If the measured value significantly deviates from the reference value, the control unit develops or updates a delay time adaptive correction term Td(adapt) for the operating point in effect during the shift. In the next 3-2 downshift at such operating point occurs, the delay time will be determined as a combined function of the base delay time Td(base) from the table of FIG. 3 and the adaptive correction term Td(adapt) from the adaptive table, so that the shift quality will be improved.

Figure 4:
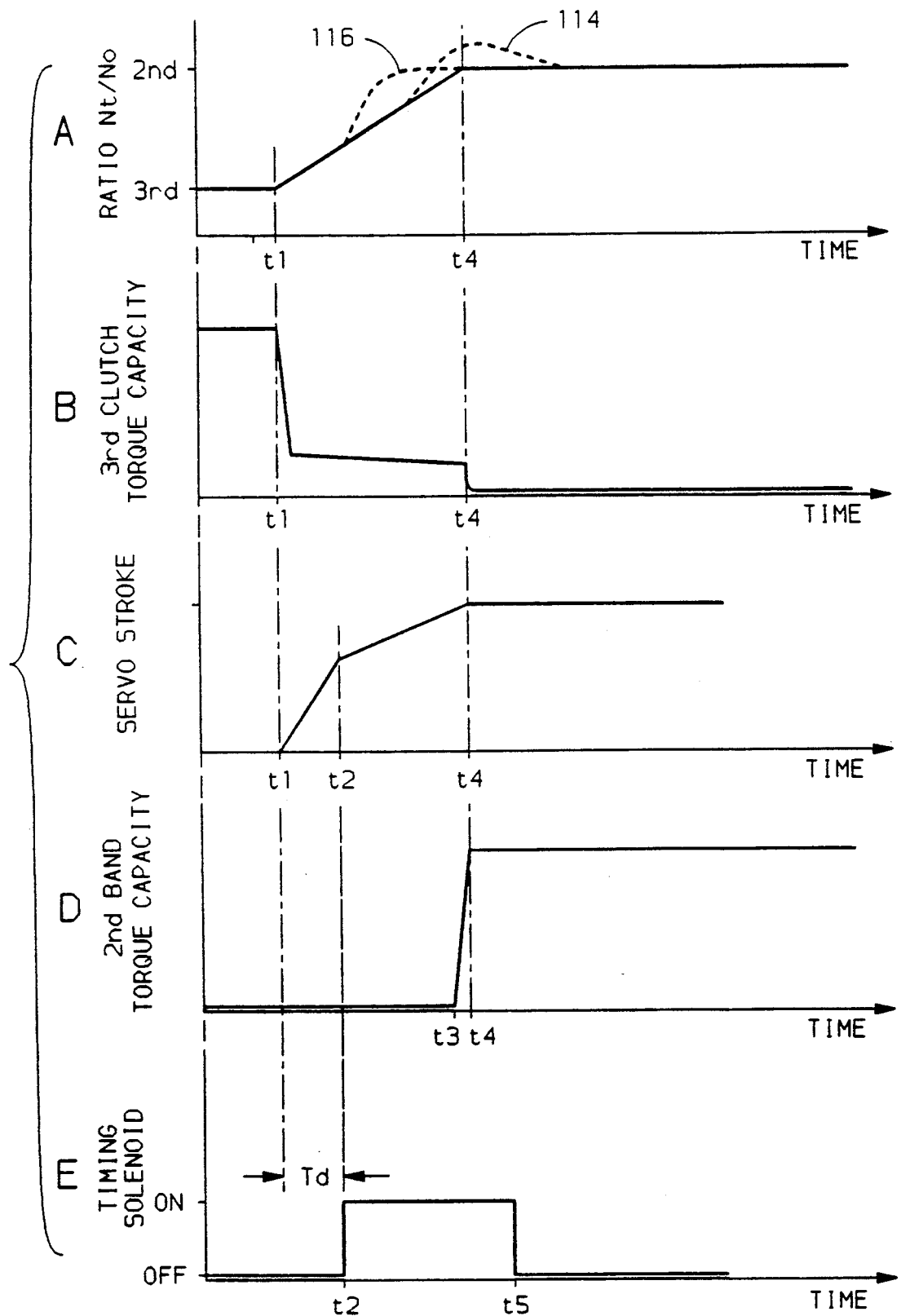
FIG. 4, Graphs A-E, graphically depict various parameters during the course of a 3-2 clutch-to-band downshift according to this invention.

A 3-2 downshift according to this invention is depicted in Graphs A-E of FIG. 4 on a common time base. Graph A depicts the transmission speed ratio Nt/No; Graph B depicts the torque capacity of the 3rd clutch 12; Graph C depicts the stroke or displacement of servo 32; Graph D depicts the torque capacity of the 2d band brake 14; and Graph E depicts the energization state of the flow control valve solenoid 90.

Initially, the shift valve solenoid 64 is energized to engage 3rd clutch 12, and the flow control valve solenoid 90 is deenergized, defining a high flow state. The shift is initiated at time t0 with the deenergization of shift valve solenoid 64 and the determination by control unit 100 of a flow control valve delay time Td. The deenergization of shift valve solenoid 64 quickly reduces the torque capacity of 3rd clutch 12, as indicated in Graph B. Shortly thereafter at time t1, the input speed, and therefore the ratio Nt/No, increases toward the 2nd ratio, as indicated in Graph A. The control unit 100 detects the change in speed ratio Nt/No as indicated in Graph E, and starts a delay timer for comparison with the determined delay time Td. Also, approximately at time t1, the flow of fluid through orifices 80 and 86 begins to stroke the servo post 92, as indicated in Graph C. This displaces the fluid in servo release chamber 68 into the 3rd clutch exhaust circuit, slowing the release of 3rd clutch 12, as indicated in Graph B.

In view of the above, it will be recognized that conditions other than a change in the speed ratio Nt/No may be used to initiate the measured delay time. For example, the delay time could be initiated in response to a detected initial displacement of the servo post 92, or the deenergization of shift valve 64.

At time t2, the delay timer count reaches the determined delay time Td, and the control unit 100 energizes the flow control valve solenoid 90 as indicated in Graph E. This closes the orifice 86, decreasing the flow to servo apply chamber 82, and reduces the rate of displacement of servo post 92, as indicated in Graph C.

At time t3 when the servo 32 is almost fully stroked, the torque capacity of 2nd band brake 14 quickly increases, as indicated in Graph D. When the fully stroked position is reached at time t4, the remaining fluid pressure in 3rd clutch servo 28 quickly exhausts through orifice 72, fully releasing the 3rd clutch 12, as indicated in Graph B. At this point, the ratio change is completed, as indicted in Graph A. Shortly thereafter at time t5, the flow control valve solenoid 90 is deenergized in preparation for the next shift.

As indicated in reference to FIG. 3, the above-described control is carried out essentially open-loop in that a predetermined delay time is used to control the operation of flow control valve 84 during the course of a shift. However, it is recognized that it may be desirable to trim the empirically determined delay times to compensate for part-to-part tolerance variations and other variations which occur over time. The control unit 100 continues to monitor specified parameters in the course of the shift to detect an aberration which indicates an inappropriate delay time Td. One such indication is engine flare, as indicated by the broken line 114 in Graph A of FIG. 3. This condition occurs if the stroke time is too long. If this condition is detected, the solenoid 90 is immediately deenergized to return the flow control valve 84 to the high flow state, and an adaptive delay term Td(adapt) for increasing the delay time is determined and stored in the adaptive table referenced above in relation to FIG. 3.

A further indication of a delay time aberration is the shift time. This condition occurs if the stroke time is too short, as indicated by the broken line 116 in Graph A of FIG. 3. This condition is detected by comparing a measure of the shift time to a reference shift time STref based on vehicle speed Nv. If the measured shift time is significantly shorter than the reference shift time, an adaptive delay term Td(adapt) for decreasing the delay time is determined and stored in the adaptive table.

Figure 5:
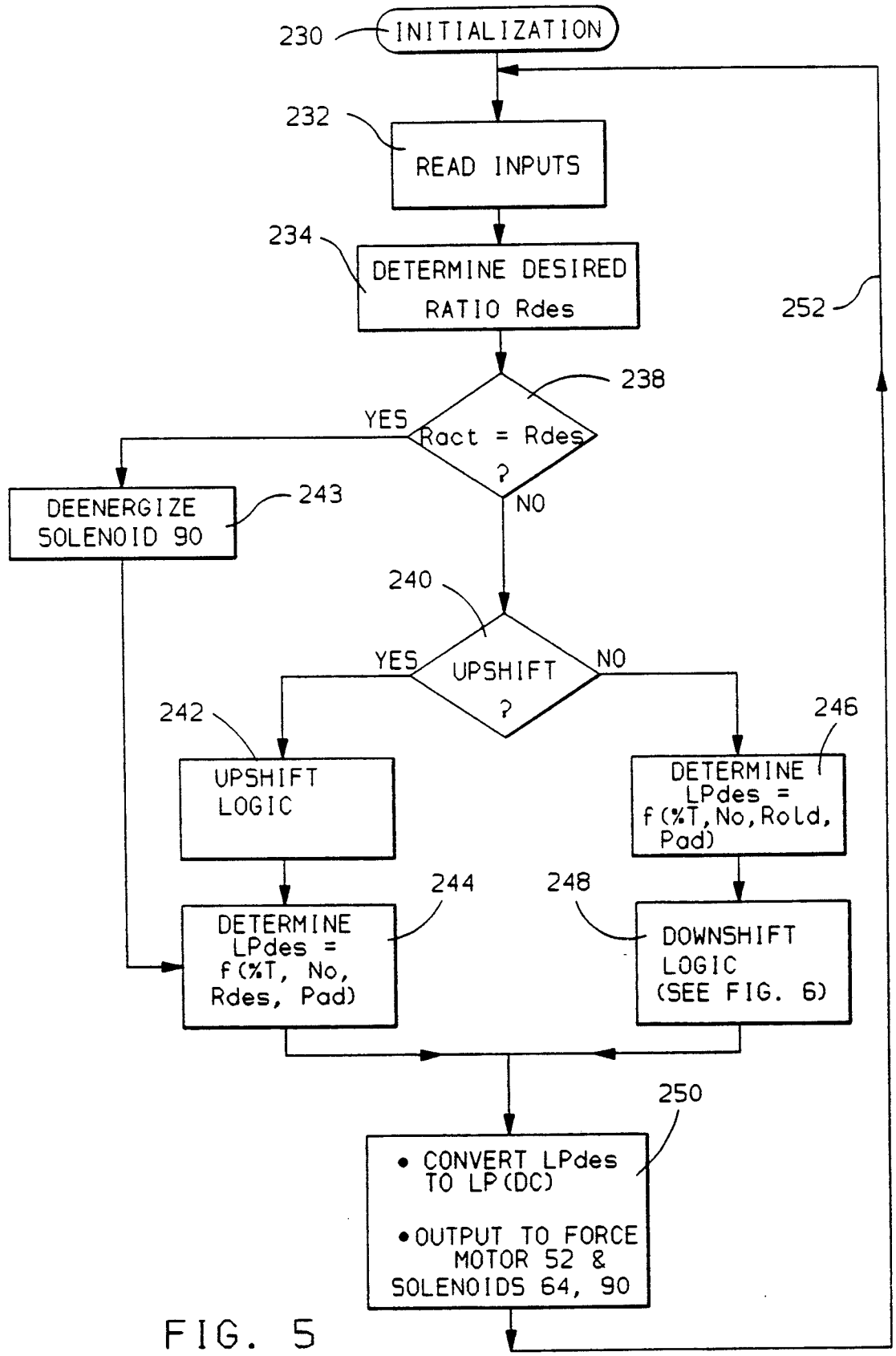
FIGS. 5 and 6a–6b depict flow diagrams representative of computer program instructions executed by the computer-based control unit of FIG. 1 in carrying out the control of this invention.
Figure 6A:
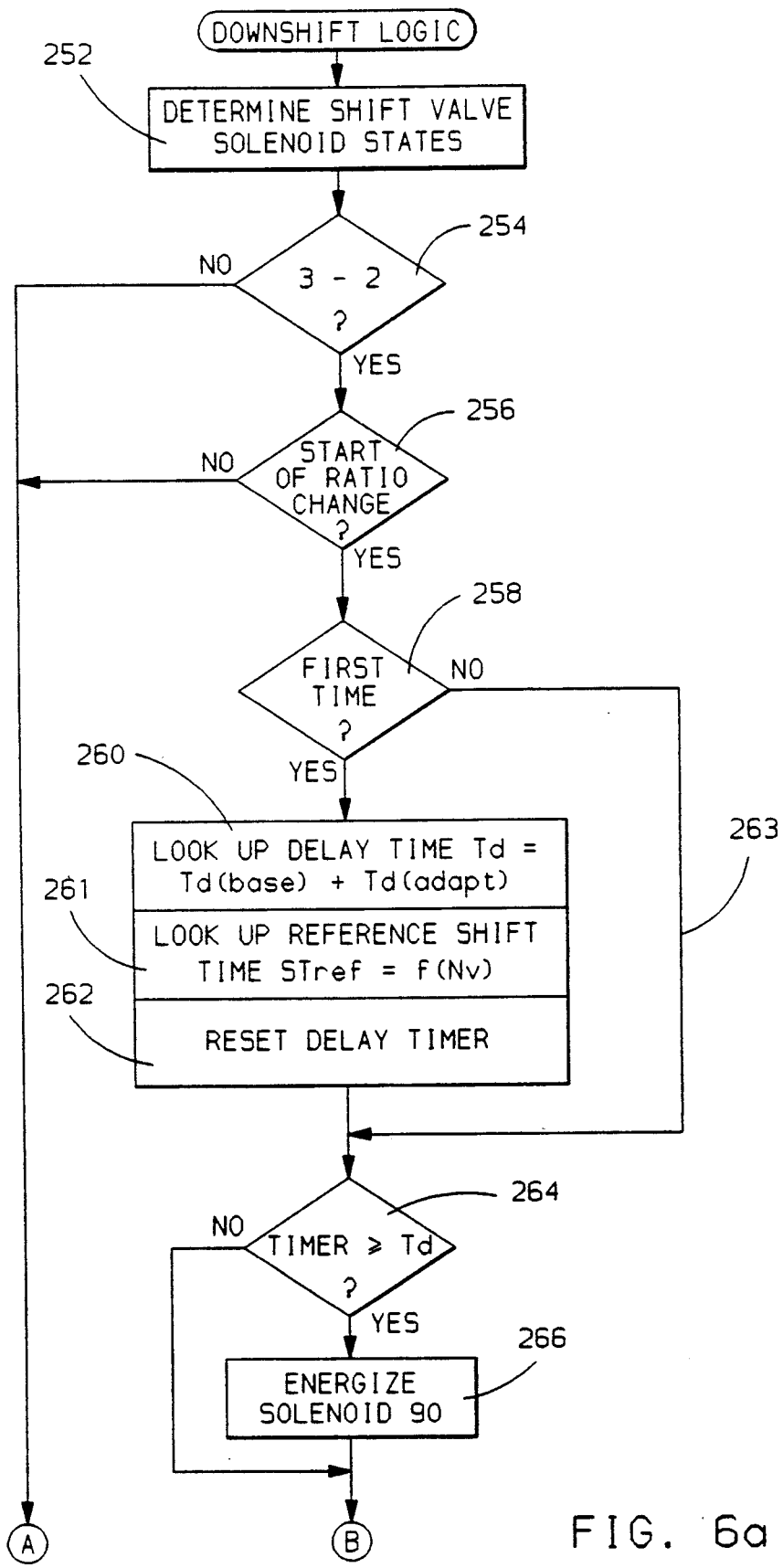
Figure 6B:
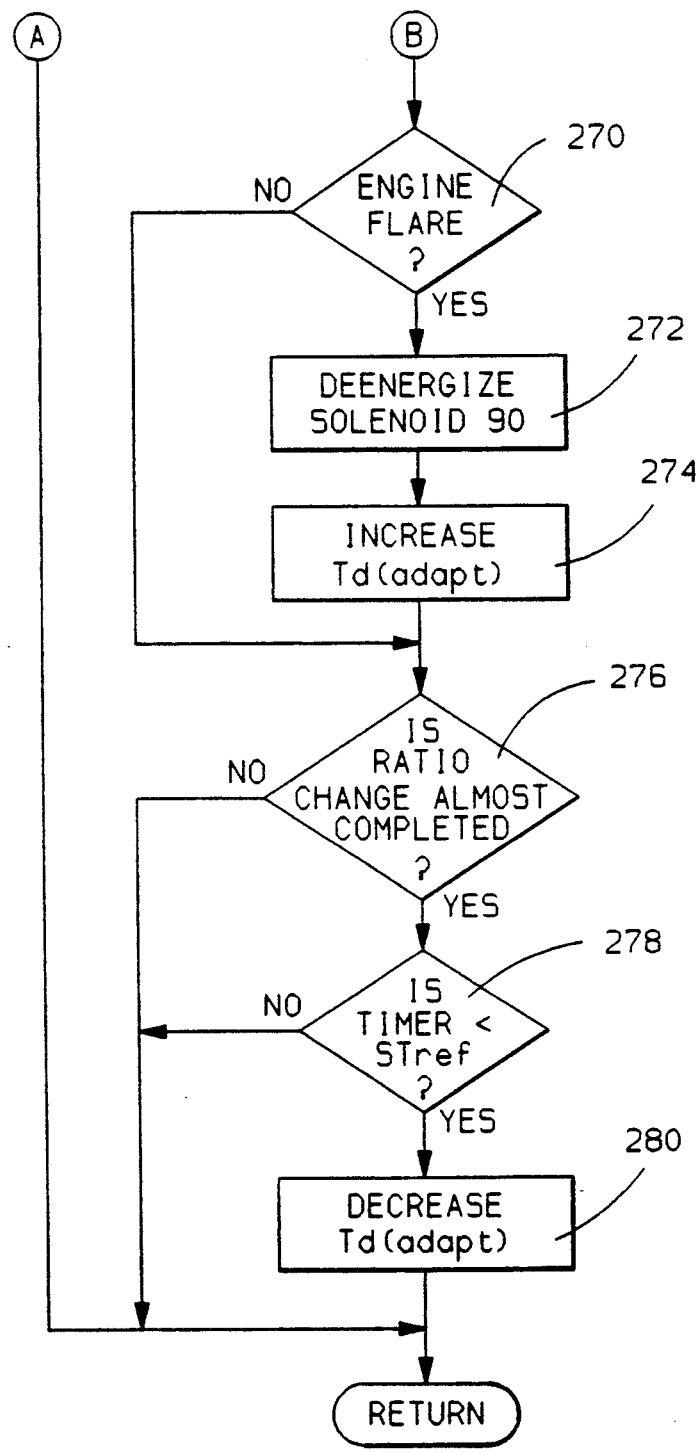

Flow diagrams representative of computer program instructions for carrying out the control of this invention with the apparatus of FIG. 1 are depicted in FIGS. 5 and 6a-6b. The flow diagram of FIG. 5 represents a main or executive computer program which is periodically executed in the course of vehicle operation in carrying out the control of this invention. The block 230 designates a series of program instructions executed at the initiation of each period of vehicle operation for setting various terms and timer values to an initial condition. Thereafter, the blocks 232-234 are executed to read the various inputs referenced in FIG. 1 and to determine the desired speed ratio Rdes. The desired ratio Rdes may be determined in a conventional manner as a predefined function of engine throttle position TPS and output vehicle speed Nv.

If the actual ratio Ract—that is, No/Nt—is equal to the desired ratio Rdes, as determined at block 238, the blocks 243 and 244 are executed to deenergize the flow control valve solenoid 90 and to determine the desired line pressure LPdes. In this case, the desired line pressure LPdes is determined as a function of throttle position and output speed, and also is adjusted based on the desired ratio Rdes and an adaptive corrective term Pad. The adaptive correction term Pad may be generated during upshifting, based on shift time, as set forth in U.S. Pat. No. 4,283,970 to Vukovich et al. issued Aug. 18, 1981, and assigned to the assignee of this invention.

If an upshift is required, as determined by blocks 238 and 240, the blocks 242 and 244 are executed to perform suitable Upshift Logic in addition to determining the desired line pressure LPdes as described above. If a downshift is required, as determined by blocks 238 and 240, the blocks 246 and 248 are executed to determine the desired line pressure LPdes and to perform the Downshift Logic. In this case, the desired line pressure is determined as a function of throttle position, output speed, the pre-shift or old ratio Rold, and the adaptive correction term Pad, as indicated at block 246.

As indicated at block 248, the Downshift Logic is set forth in further detail in the flow diagram of FIGS. 6a-6b. In any case, the block 250 is then executed to convert the desired line pressure LPdes to a solenoid duty cycle LP(dc), to output the duty cycle LP(dc) to force motor 52, and to output discrete solenoid states to the solenoids 64 and 90.

Referring now to the Downshift Logic flow diagram of FIGS. 6a-6b, the block 252 is first executed to determine the required states of the various shift valve solenoids. As indicated above, the present invention concerns the 2-3 shift valve solenoid 64, which is activated to initiate a 2-3 upshift and deactivated to initiate a 3-2 downshift. If the shift is a 3-2 downshift, as detected at block 254, the blocks 256-274 are executed to determine the required state of flow control valve solenoid 90 as a function of the vehicle speed Nv and engine throttle position TPS, as described above in reference to FIGS. 3-4.

When the transmission speed ratio Nt/No first starts to increase toward 2nd, as determined by blocks 256-258, the blocks 260-262 are executed to look up the delay time Td as a function of measured vehicle speed and engine throttle position values Nv, TPS, to look up a reference shift time STref as a function of the vehicle speed Nv, and to reset the DELAY TIMER. As indicated at block 260, the delay time Td is comprised of two components: a base delay time Td(base) and an adaptive delay time Td(adapt). Thereafter during the shift, execution of the blocks 260-262 is skipped, as indicated by the flow diagram line 263. Until the DELAY TIMER reaches the determined delay time Td, or unless engine flare is observed, as determined by blocks 264 and 270, the remainder of the routine is skipped. Once the DELAY TIMER reaches the determined delay time Td, the block 266 is executed to energize the flow control valve solenoid 90.

The adaptive delay time functions are set forth in FIG. 6b, which is a continuation of the flow diagram of FIG. 6a. If engine flare is observed, by detecting an unexpected increase in the ratio Nt/No, for example, the blocks 272-274 are executed to deenergize the flow control solenoid 90 and to increment or update the adaptive delay time value Td(adapt) for the vehicle speed vs. engine throttle position operating point used at block 260. The amount of the increase may be fixed or variable as a function of the amount or timing of the observed flare. If the ratio change is almost complete and the DELAY TIMER is significantly less than the the reference shift time value STref, as determined at blocks 276-278, the block 280 is executed to decrement or update the adaptive delay time value Td(adapt) for the vehicle speed vs. engine throttle position operating point used at block 260. As with the adaptive increase of Td(adapt), the amount of the adaptive decrease may be fixed or variable as a function of the deviation of the actual shift time (DELAY TIMER) from the reference shift time STref.

While illustrated in reference to a wash-out shift arrangement, it will be appreciated that the engagement rate control of the present invention will find application in the engagement of any torque transmitting device having a member which is displaced by a servo in relation to the volume of fluid directed to an apply chamber thereof. It is expected that various other modifications to the illustrated embodiment will occur to those skilled in the art as well, and it should be understood that controls incorporating such modifications may fall within the scope of the present invention, which is defined by the appended claims.

The embodiments of the invention in which an exclusive property or privilege is claimed are defined as follows:

1. A motor vehicle transmission control system for controlling the supply of fluid to a servo chamber of predetermined volume which is filled to engage a fluid operated torque transmitting device, said control system comprising:

a source of fluid pressure;

fluid restriction means including first and second alternate fluid circuits, and an electrically activated valve adapted to connect one of said fluid circuits between said fluid pressure source and said chamber; and control means effective when it is desired to engage said fluid operated torque establishing device for activating said electrically activated valve to connect said fluid pressure source to said chamber via said first fluid circuit during a first portion of the engagement and via said second fluid circuit during a second portion of said engagement so as to fill the predetermined volume in a desired time and thereby control the engagement time of said torque transmitting device, said control means including look up means for determining a delay time in relation to a desired engagement time of said torque transmitting device, and means for initiating said second portion of said engagement after the expiration of an actual time period corresponding to said determined delay time.

2. The control system as set forth in claim 1, wherein said torque transmitting device is connected to transmit torque from a vehicle engine to a vehicle drive wheel, said first fluid circuit permits a relatively high flow of fluid to said chamber compared to said second fluid circuit, and said control means includes override means for activating said electrically activated valve to connect said fluid pressure source to said chamber via said first fluid circuit in response to a detected flare condition of said engine, thereby to complete the engagement of said torque transmitting device with said relatively high fluid flow.

3. The control system set forth in claim 1, wherein the control means initiates said actual time period at the initiation of said engagement.

4. The control system set forth in claim 1, wherein the delay time determined by said look up means is determined as a function of the fluid pressure developed by said source.

5. A motor vehicle transmission control system for controlling the supply of fluid to a servo chamber of predetermined volume which is filled to engage a fluid operated torque transmitting device, said control system comprising;
 a source of fluid pressure;
 fluid restriction means including first and second alternate fluid circuits, and an electrically activated valve adapted to connect one of said fluid circuits between said fluid pressure source and said chamber;
 look-up means effective when it is desired to engage said fluid operated torque establishing device for determining a delay time in relation to a desired engagement time of said torque transmitting device; and
 control means for activating said electrically activated valve to connect said fluid pressure source to said chamber via said first fluid circuit during a first portion of the engagement, and after the expiration of an actual time period corresponding to said determined delay time, via said second fluid circuit, thereby to control the engagement time of said torque transmitting device to said desired engagement time.

6. The control system set forth in claim 5, wherein the first fluid circuit of said fluid restriction means permits a relatively high flow of fluid to said chamber and said second fluid circuit of said fluid restriction means permits a relatively low flow of fluid to said chamber 7. The control system set forth in claim 6, wherein said torque transmitting device is connected to transmit torque from a vehicle engine to a vehicle drive wheel, and said control means includes override means for activating said electrically activated valve to connect said fluid pressure source to said chamber via said first fluid circuit without regard to said actual time period in response to a detected flare condition of said engine, thereby to complete the engagement of said torque transmitting device with said relatively high fluid flow.

8. The control system set forth in claim 5, wherein the delay time determined by said look-up means includes an empirically derived base component and a learned adaptive component.

9. The control system set forth in claim 8, wherein the look-up means determines both the base component and the adaptive component as a function of specified vehicle operating parameters.

10. A motor vehicle transmission control system for controlling the supply of fluid to a servo chamber of predetermined volume which is filled to engage a fluid operated torque transmitting device, said torque transmitting device being connected to transmit torque from a vehicle engine to a vehicle drive wheel, said control system comprising;
 a source of fluid pressure;
 fluid restriction means including a first fluid circuit for permitting a relatively high fluid flow, a second fluid circuit for permitting a relatively low fluid flow, and an electrically activated valve adapted to connect one of said first and second fluid circuits between said fluid pressure source and said chamber;
 look-up means effective when it is desired to engage said fluid operated torque establishing device for determining a first circuit time in relation to a desired engagement time of said torque transmitting device, said first circuit time comprising an empirically derived base component and a learned adaptive component; and
 control means for activating said electrically activated valve to connect said fluid pressure source to said chamber via said first fluid circuit during a first portion of the engagement, and after the expiration of an actual time period corresponding to said determined first circuit time, via said second fluid circuit.

11. The control system set forth in claim 10, including:
 adaptive means for increasing the adaptive component of said delay time in response to a detection of an engine flare condition, so that in a subsequent engagement of said torque transmitting device, the first portion of said engagement will be increased to decrease said engagement time.

12. The control system set forth in claim 10, including:
 adaptive means for determining a reference shift time representative of a shift time which will occur with a properly determined first circuit time;
 means for determining an actual shift time in relation to the time actually required to engage said torque transmitting device; and
 means for increasing the adaptive component of said delay time if the reference shift time significantly exceeds the actual shift time, so that in a subsequent engagement of said torque transmitting device, the first portion of said engagement will be decreased to increase said engagement time.

* * * * *